March 31, 1970   H. O. CORBETT ET AL   3,503,778
METHOD OF COATING A SUBSTRATE WITH A PLASTIC MATERIAL
Filed Oct. 30, 1967   2 Sheets-Sheet 2
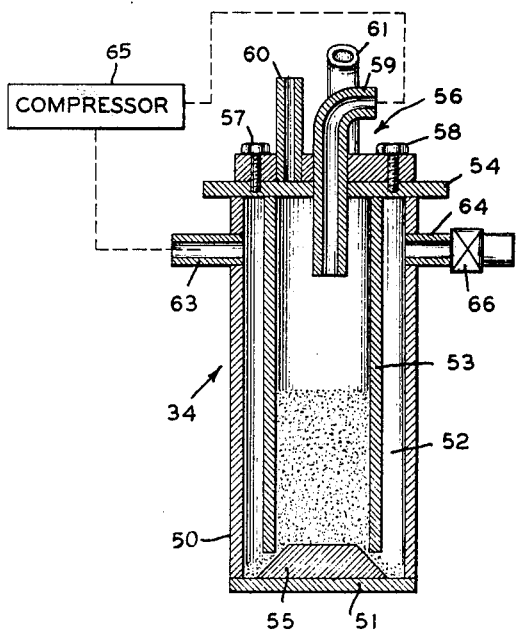
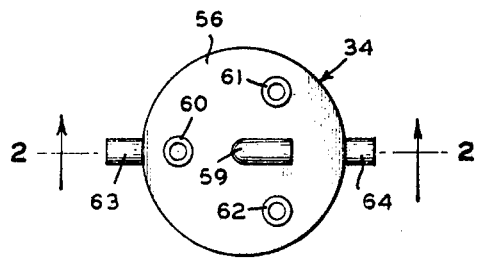
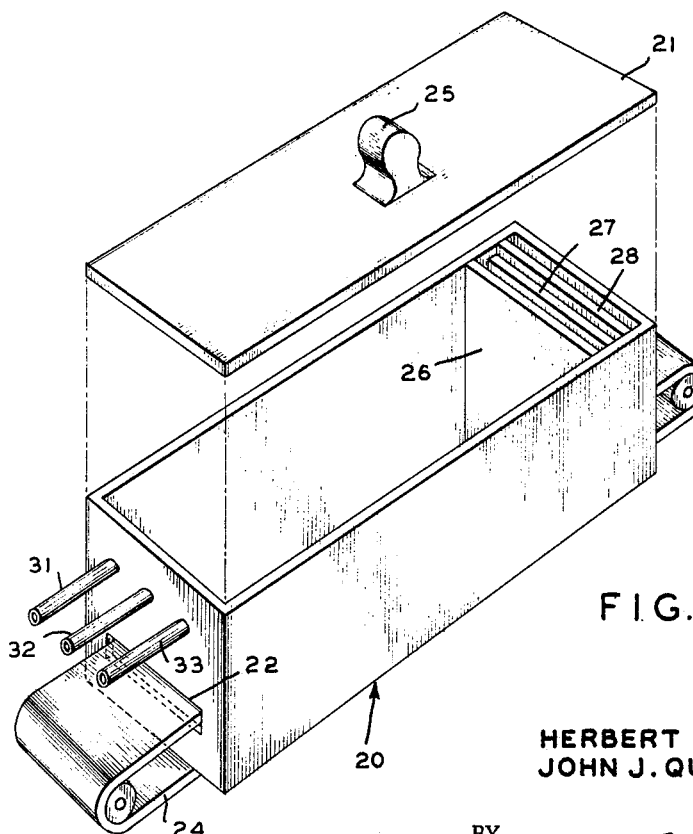
INVENTORS
HERBERT O. CORBETT
JOHN J. QUACKENBUSH
BY Allen A. Meyer, Jr.
ATTORNEY 3,503,778
**METHOD OF COATING A SUBSTRATE WITH
A PLASTIC MATERIAL**
Herbert O. Corbett, Cincinnati, Ohio, and John J. Quackenbush, Monroe, Conn., assignors to National Distillers and Chemical Corporation, New York, N.Y., a corporation of Virginia
Continuation-in-part of application Ser. No. 542,040, Apr. 12, 1966. This application Oct. 30, 1967, Ser. No. 679,073
Int. Cl. B44d 1/092, 1/094
U.S. Cl. 117—21                     4 Claims

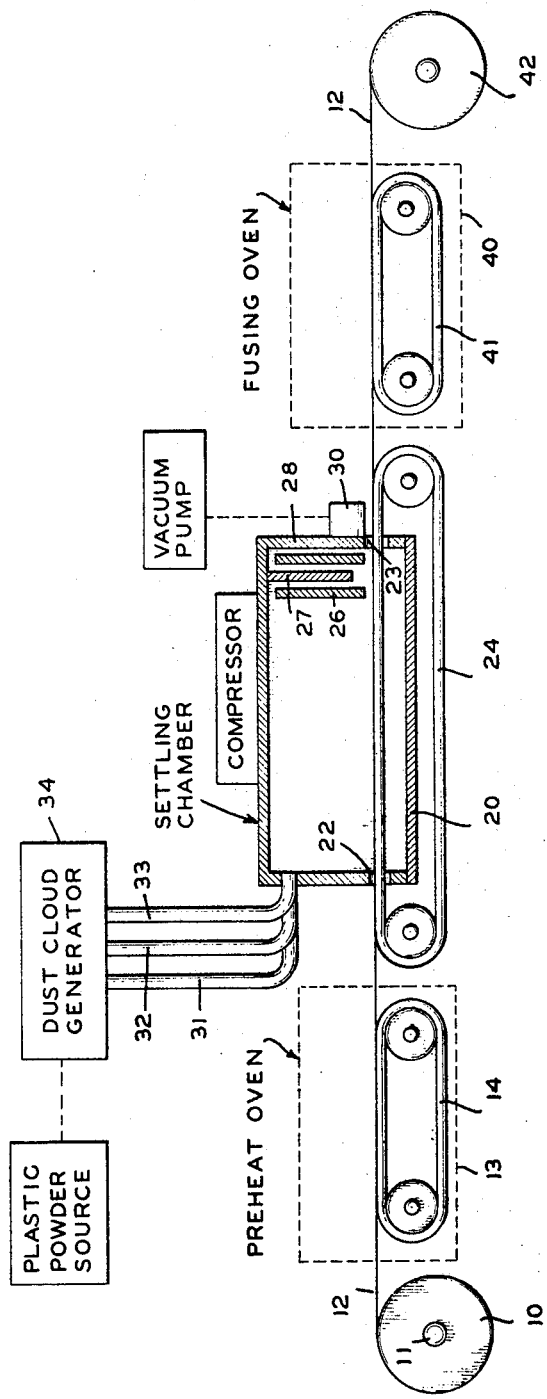

ABSTRACT OF THE DISCLOSURE

A substrate is coated by a process comprising generating a dust cloud of very finely divided plastic powder, preheating the substrate, causing the dust cloud to settle under quasi-equilibrium conditions onto the substrate and further heating the coated substrate to effect fusion of the plastic powder.

---

This application is a continuation-in-part application of U.S. application Ser. No. 542,040 (now U.S. Patent 3,354,865) filed Apr. 12, 1966, entitled "Cloud Dispersion of Fine Plastic Powders" in the names of Quackenbush and Corbett, and is a division of application Ser. No. 555,543 (now U.S. Patent 3,359,944) filed June 6, 1966, by these same inventors, both of these applications being assigned to the present assignee.

The powder coating of webs of plastic material or paper, or the like, is well known to the art. In such arrangements, a stationary or moving base web is to have deposited or dusted thereon a suitable powder with the web and powder later being operated upon to cause the thermoplastic particles to melt and fuse to the web. Thus, the coated web can be passed through an oven and subjected to temperatures which will cause the thermoplastic particles to melt and fuse to form an intimate bond and a continuous or non-continuous type coated surface, as desired.

The materials can be further press-nipped under pressure as by heated rolls to force the particles down into the web and provide high gloss surfaces or intimate bonding of fibers or fiber-like materials.

Considerable difficulty has been experienced in the past to properly suspend and evenly deposit very finely ground thermoplastic powders of varying densities (in the range of .910 to .965) and varying particle sizes (from 2 to 100 microns).

The present invention provides a novel apparatus for providing a dust cloud of diverse particle sizes and densities in the dry form. This cloud of material is then deposited on a suitable movable or stationary web in an even manner with controlled feed and dispersion levels and good control over the complete deposition process. The dry coating line constructed in accordance with the invention will consist of four major components: a preheat oven, a settling chamber, a fusing oven, and a dust cloud generating device.

The preheat oven will contain a suitable heating structure such as a 2160 watt fused quartz edge compensated heater in an insulated chamber. The web upon which dust is to be deposited is then moved through this chamber so that its surface will be heated to some predetermined level which is somewhat below the minimum temperature at which undesirable changes in physical or chemical properties of the web take place. This surface temperature will, of course, be a function of both oven temperature and line speed where, for example, line speeds of 45 feet/min. could be used for a paper web.

The web then moves from the preheat oven into a coating chamber where the coating chamber contains a saturated cloud of plastic particles which are to be deposited where the cloud is held under quasi-equilibrium conditions. That is, the fallout or coating rate of the power will be balanced by the introduction of new powder. Coating thickness will be governed by line speed and the rate at which powder is introduced into the chamber.

The surface temperature of the substrate will then soften some of the thermoplastic particles that fall upon the substrate to provide an initial bond counteracting the effect of air currents generated by the moving substrate. If desired, this chamber can be longitudinally compartmentalized to permit coating in diverse lengthwise patterns by shutting off various longitudinal compartments.

The dust cloud is then introduced through various feed ports in the forward wall of the chamber where these ports can be used in an desired combination to produce a proper coating distribution.

The web with the powder deposited thereon is then moved into a fusing oven which is located directly behind the coating chamber and contains suitable heat sources such as two or more fused quartz 4320 watt heaters, each governed by respective temperature controllers. The temperature of the fusing oven will then cause fusing of the deposited dust coating with the lowest possible increase in substrate temperature. The oven is preferably pressurized to prevent entry of loose dust particles. It should be noted that the coating chamber will also operate under a slightly positive pressure, again to prevent entry therein of loose dust particles.

The final and essential component of the main system is the dust cloud generating device. The novel dust cloud generating device of the invention is so constructed that the plastic powder loaded therein will be agitated and suspended in space by means of a high volume, low pressure flow of air. Escaping dust is then channeled through suitable conduits or hoses to the above noted settling or coating chamber.

Dust cloud density volume may be controlled by partially blocking the air intake of the blower supplying air to the interior of the dust cloud generator.

The dust cloud generator, in accordance with the invention, consists of two concentric wall sections which communicate with one another at the bottom of the chamber. The central chamber is then loaded with the powder which is to be deposited, and two air sources are connected to the unit; the first to the annular concentric chamber surrounding the main chamber, and the second to the interior of the main or central chamber.

Air flow from the concentric chamber which surrounds the main chamber then passes up through the bottom of the main chamber and through the body of the powder contained therein. This operates in conjunction with air introduced into the interior of the chamber to generate a dust cloud which can then be taken out through suitable conduits into a settling chamber.

Accordingly, a primary object of this invention is to provide a novel method and apparatus for the dry coating of plastic particles on a substrate.

Another object of this invention is to provide a novel dust cloud generator which can create an evenly balanced dust cloud of plastic particles of diverse densities and sizes.

Still another object of this invention is to provide a novel dusting process for dusting micro powders on a substrate wherein the process provides a highly controlled feed and dispersion level of plastic powders.

These and other objects of this invention will become apparent from the following description when taken in connection with the drawings, in which:

FIGURE 1 schematically illustrates a particle dusting line constructed in accordance with the present invention.

FIGURE 2 is a cross-sectional diagram of the dust cloud generator constructed in accordance with the invention.

FIGURE 3 is a top view of the dust cloud generator of FIGURE 2.

FIGURE 4 is an exploded perspective view of the settling chamber used in FIGURE 1.

Referring first to FIGURE 1, there is illustrated therein a schematic diagram showing the operation of a dusting line incorporating the present invention wherein a supply reel 10 which could, for example, be a roll of paper which is to be coated, is stationarily mounted on a rotating pivotal support 11 in the standard manner.

It is to be noted that while the invention is described herein with reference to the coating of paper, the invention has diverse applications and could be applied, for example, to the coating of stationary objects, or the coating of plastic webs, or the like.

The web 12 taken from reel 10 is first passed into a preheat oven stage 13 which includes a suitable heating means (not shown) and a conveyor system comprised of conveyor belt 14 which circulates in the direction shown to carry the web 12 through the preheat oven 13 from left to right. Suitable doors or gates are provided at either end of the preheat oven to permit entry and exit of web 12.

The preheat oven 13 will cause an initial heating of the substrate of web 12 to prepare it for the settling of dust powders from the settling or coating chamber 20. The settling chamber 20, which will be described in more detail in FIGURE 4, is comprised of a substantially enclosed chamber having a removable top 21 which forms a dust-proof connection to the top of chamber 20 and has two openings therein 22 and 23 providing access for both web 12 and for a conveyor belt 24 which carries the web through the settling chamber.

A compressor 25 is connected to the top of chamber 20 to permit the application of low velocity air to the interior of the chamber to cause a positive pressure therein, thereby preventing the entrance of free powders into openings 22 and 23. Note that the right-hand end of chamber 20 is provided with a baffle consisting of slidable plates 26, 27 and 28 which permits pressure relief for air flow out of chamber 20 and through exit opening 23 via a tortuous path. A vacuum chamber 30 may then be connected immediately adjacent outlet opening 23 which will pick up excessively loose powders which are deposited on web 12.

As will be described more fully hereinafter, three output conduits 31, 32 and 33 from a dust cloud generator 34 are connected to the left-hand end of settling chamber 20. After dust has precipitated on web 12 within the settling chamber 20, the web continues into a fusing oven 40 which has its separate conveyor belt 41 where the temperature within fusing oven 40 is sufficiently high to cause fusing of the powders deposited upon the web. Thereafter, the web is moved to a suitable windup stage 42 where the web may be wound, a sufficient time being permitted for cooling of the plastic layer deposited atop web 12. Note that a suitable pair of nip rolls could be connected in front of windup stage 42 to compact the fused layer of plastic on the top of web 12.

The dust cloud generator 34, described in FIGURE 1, is shown in more detail in FIGURES 2 and 3. Referring now to FIGURES 2 and 3, it will be seen that the dust cloud generator is formed of a first outer steel cylinder 50 having a base 51 welded thereto. An outer annular chamber 52 is then formed by means of an interior cylinder 53 which is welded to upper disk 54 which is also welded to the outer cylinder 50. A metallic flow director 55 is then suitably fastened to base 51 which directs air flow from annular chamber 52 up into the interior of cylinder 53 which is spaced from the top surface of base 51.

A head member 56 is then bolted to disk 54 as by suitable bolts 57 and 58 where the head member 56 carries an input air conduit 59 and three outlet fittings 60, 61 and 62, which are connectable to hoses 31, 32 and 33, respectively, of FIGURE 1. The top of annular chamber 52 is then fitted with suitable conduits 63 and 64. Conduits 59 and 63 are connected to the same compressor 65. Conduit 64 is then fitted with a suitable bleeding valve 66 to permit the bleeding of air pressure from annular chamber 52.

In operation, the head member 56 is removed from disk 54 and the interior cylinder 53, which may be approximately 25 inches high, is loaded with a suitable plastic powder to about ⅓ to ½ of its height. A suitable plastic powder is polyethylene powder known by the trademark Microthene, which is a trademark of the National Distillers and Chemical Corporation.

The head member 56 is then bolted in place with suitable gasketing means (not shown) forming an air-tight connection to the disk 54, and compressor 65 is turned on to supply an air flow to conduit 63 and annular chamber 52 of approximately 100 cubic feet/min. The air flow connected to conduit 59 will be approximately 50 cubic feet/min. where the length of conduit 59 extending into cylinder 53 is approximately 10 inches and falls short of the height of the plastic powder charge in cylinder 53.

The pressures and air turbulence created in the interior of cylinder 53 are then such as to cause a dust cloud having a slight over-pressure (with respect to the pressure of settling chamber 20), which dust cloud is conducted through conduits 60, 61 and 62 into their respective hoses connected thereto and to the settling chamber 20 of FIGURE 1.

The settling chamber 20 is further illustrated in FIGURE 4 wherein the hoses 31, 32 and 33 are shown as connected to the left-hand end of the settling chamber toward the top thereof.

As pointed out above, it has been found that, by arranging the dust cloud generator and settling chamber in the manner shown in FIGURES 2, 3 and 4, dust of diverse particle sizes and densities will be suspended within settling chamber 20 with a quasi-equilibrium wherein the amount of dust coming into the chamber is balanced by the amount settling on the web carried through the chamber by conveyor 24. The amount of powder being brought out of the dust cloud generator can be controlled by suitable control of the bleeding valve 66 of FIGURE 2 conduit 64 which controls the pressure conditions within the dust cloud generator.

Although this invention has been described with respect to its preferred embodiments, it should be understood that many variations and modifications will now be obvious to those skilled in the art, and it is preferred, therefore, that the scope of the invention be limited not by the specific disclosure herein.

What is claimed is:
1. A method of coating a substrate which comprises:
 (a) generating a dust cloud of finely divided plastic particles by passing a first flow of gas upward through a volume of plastic particles 2 to 100 microns in size which are contained in a closed chamber to a height less than the height of said chamber, and passing a second flow of gas into said chamber above the normal level of said volume of particles,
 (b) conducting said dust cloud to a settling chamber maintained at a pressure below the pressure in said first chamber,
 (c) preheating the substrate to a temperature above the softening point of the plastic particles,

(d) introducing said substrate into said settling chamber for a period of time sufficient to permit a layer of said plastic particles to be deposited on said substrate, (e) maintaining the rate of introduction of the plastic particles into the settling chamber in balance with the rate at which the material settles on the substrate, and (f) heating the coated substrate to a temperature sufficient to cause fusing of the plastic particles on said substrate.

2. The process of claim 1 wherein the plastic material is polyethylene.

3. The method of claim 1 wherein said plastic particles have a density within the range of .910 to .965.

4. The process of claim 1 wherein said substrate is subjected to pressure after heating.

References Cited

UNITED STATES PATENTS

| | | | |
|---|---|---|---|
| 2,513,434 | 7/1950 | Tinsley | 117—21 X |
| 3,016,875 | 1/1962 | Ballentine et al. | 117—21 X |
| 3,067,469 | 12/1962 | Yarrison | 117—21 X |
| 3,161,530 | 12/1964 | Strobel | 117—21 X |
| 3,167,442 | 1/1965 | Brooks | 117—21 |
| 3,199,491 | 8/1965 | Bader et al. | 117—21 X |
| 3,199,923 | 8/1965 | Brooks | 117—21 X |
| 3,202,539 | 8/1965 | Holt et al. | 117—21 X |
| 3,291,630 | 12/1966 | Deyle et al. | 117—21 X |

WILLIAM D. MARTIN, Primary Examiner

P. F. ATTAGUILE, Assistant Examiner

U.S. Cl. X.R.

117—19, 65.2